United States Patent [19]

Powers

[11] Patent Number: 4,685,213
[45] Date of Patent: Aug. 11, 1987

[54] RESCUE AXE

[75] Inventor: Steven J. Powers, Chilhowie, Va.

[73] Assignees: Fred R. Murray, Jr.; W. W. Guy; G. Arnold, all of Chilhowie, Va. ; part interest to each

[21] Appl. No.: 763,233

[22] Filed: Aug. 7, 1985

[51] Int. Cl.$^4$ .................................................. B25F 1/00
[52] U.S. Cl. ......................................... 30/123; 7/100; 7/145; 7/131; 7/158; 29/270
[58] Field of Search ................... 7/100, 144, 145, 151, 7/158, 161; 29/270, 275; 30/123

[56] References Cited

U.S. PATENT DOCUMENTS

| 1,855,975 | 4/1932 | Lamb | 7/158 |
| 3,599,255 | 8/1971 | Carroll | 7/145 X |
| 4,234,988 | 11/1980 | Ross et al. | 7/161 X |
| 4,287,623 | 9/1981 | Trran | 7/158 |

Primary Examiner—Douglas D. Watts
Attorney, Agent, or Firm—Neil F. Markva

[57] ABSTRACT

A rescue axe is used for forcibly entering a vehicle. The axe comprises a head portion located at one end of a handle portion. The head portion includes a piercing entry section, a cutting section, and an impacting section. The entry section includes a metal piercing member on one side of the head portion. The impacting section includes a striking edge on a side opposite the metal piercing member. The cutting section includes a blade cutting edge extending rearwardly from an open mouth located on a side of the head portion between the one side including the piercing member and the opposite side including the striking edge. The head portion includes a blade member located between the blade cutting edge and the striking edge. The handle portion extends rearwardly from a further side of the head portion opposite the open mouth side of the head portion.

18 Claims, 4 Drawing Figures

RESCUE AXE

FIELD OF THE INVENTION

This invention relates to a rescue axe used to forcibly enter vehicles in which victims are trapped. More particularly, the invention is directed to an axe device having a head portion with a handle extending from one side thereof for manual operation in which a single person may effectively enter a vehicle by cutting a hole through the sheet metal material forming the vehicle body.

BACKGROUND OF THE INVENTION

The use of various devices for entering vehicles to free trapped victims is known. It is particularly important to establish a speedy access to those victims since it may mean the difference between life and death for them. The use of such prior art devices to cut away the body sheet metal to create an access opening is deemed to require some skill in the manipulation of tools.

In the U.S. Pat. No. 4,062,117 the rescue tool was developed for primarily entering through a window or windshield of an automobile and allowing the cutting of the material holding those windows in place. Further, the cutting edge is used to sever the seatbelt around the person.

The rescue tool of U.S. Pat. No. 4,062,117 can be used to sever the body sheet metal of the vehicle only by using a further hammer device to drive the point of that tool through the sheet metal. Further, a rope or a pipe must be used in conjunction with this tool for cutting the sheet metal. The disadvantages of such a small tool are deemed obvious.

The metal cutting apparatus disclosed in U.S. Pat. No. 3,694,918 includes a bar having a pry surface and a cutting blade at one end thereof. A relatively complex cylinder is slideably mounted on the cutting blade and is required to drive the point of the cutting blade through the sheet metal. Cutting is then accomplished by rocking the bar using the pry surface of the device as a fulcrum. The cylinder must first be manipulated back and forth on the shaft of the pry surface in order to effectuate the desired piercing. The slideably disposed cylinder must be held with some skill to effectuate the rocking motion necessary for cutting the vehicle sheet metal.

Numerous other devices are known for simply severing metal and are particularly useful in the sheet metal working and cutting industry. These devices along with various other types of cutting tools are readily found in the prior art. The following patents disclose various forms of metal severing tools useful in cutting sheet metal.

| | | |
|---|---|---|
| 1,624,853 | 2,075,302 | 2,285,386 |
| 1,875,612 | 2,255,196 | |

None of the references found in the prior art show the simple one-piece design of the rescue axe of the present invention. The rescue axe includes the facility of being able to enter the sheet metal body, sever the sheet metal of the vehicle body and may be effectively used to remove the roof support braces away from the sheet metal. The rescue axe may also be used to break the automotive glass. The cutting edge of the blade is sufficient to cut through the safety belt strap material, if necessary.

SUMMARY OF THE INVENTION

The invention as disclosed and claimed herein is directed to a rescue axe for forcibly entering a vehicle. The axe comprises a head portion located at one end of a handle portion. The heat portion includes a piercing entry section, a cutting section, and an impacting section. The entry section includes a metal piercing means on one side of the head portion. The impacting section includes a striking edge on a side opposite the metal piercing means. The cutting section includes a blade cutting edge extending rearwardly from an open mouth located on a side of the head portion between said one side including the piercing means and said opposite side including the striking edge.

The head portion includes a blade member located between the blade cutting edge and the striking edge. The handle portion extends rearwardly from a further side of the head portion opposite the open mouth side of the head portion.

In a specific embodiment, the head portion comprises a flat plate member having two parallel broad sides with a peripheral edge defining an outer profile inclusive of the piercing entry section, the cutting section and the impacting section. The handle portion includes an elongated handle member having a longitudinal axis and located on the side opposite the head portion side including the cutting section.

A feature of the invention is directed to the metal piercing means which includes a pointed member extending outwardly from the one side of the head portion. The pointed member includes a cutting edge extending from an outer point to stop means for limiting the depth of penetration of the piercing means. The limiting stop means includes edge means against which the head portion may be leveraged out of the opening made by the piercing means.

A specific embodiment of the piercing means includes a V-shaped pointed member having a cutting edge extending along at least one edge of the V-shaped profile. The edge means are located at either side of the V-shaped profile.

On the blade member, the distance between any point on the blade cutting edge and any point on the striking edge is an amount sufficient to withstand blows on the striking edge and cutting pulls on the cutting edge by preventing the blade member from fracturing across that distance. This is important when the rescue axe is being used to break window glass from the vehicle or for knocking out the roof support braces away from the sheet metal of the vehicle body. The blade portion member is disposed on one side of the open mouth and a fulcrum section is disposed at the other side of the open mouth opposite the blade member to form a cutting mouth.

A further feature of the invention is directed to the structure of the fulcrum section which has an outer end fulcrum contacting surface which is effective to press against the top of the sheet of material while the blade is located below the sheet of material. The handle member is effective for pulling upwardly to cause the blade handle edge to sever the sheet material. The fulcrum contacting surface includes friction producing means to enhance the gripping function of the fulcrum contacting surface with the sheet of material being severed. The friction producing means includes notches extending transversely of the pulling forces exerted on the handle member.

A further feature of the invention is directed to the blade cutting edge which has a length of about four (4) inches measured from one end thereof to the other. The rescue axe is first used to pierce the sheet metal, the blade member is then placed under the sheet material and a rocking motion is then effected on the handle of the device to cause the cutting edge to sever the sheet metal. The significant aspect of this rescue axe is that on the rear portion of the cutting blade, there is a striking edge which may be used as a battering ram to knock away automotive glass and roof supports where necessary.

Upon entering the sheet metal of the vehicle body, the material frequently needs to be pulled out so that the blade can be placed thereunder to begin the cutting. Thus, another feature of the invention is that the head portion includes a sheet metal edge gripping portion for gripping the edge of the sheet material to manipulate the position thereof. In a specific embodiment of this feature, the edge gripping portion comprises a slit extending from an outer edge of the head portion into the body of the head portion. The slit is sufficiently wide to receive the edge of the sheet material to be manipulated. The slit is straight and is located at the outer end of the blade member on the side thereof opposite the blade cutting edge. The outer peripheral edge of the blade member includes an outer straight edge section disposed in parallel relationship with respect to the straight slit.

BRIEF DESCRIPTION OF DRAWINGS

Other objects of this invention will appear in the following description and claims, reference being made to the accompanying drawings forming a part of the specification wherein like reference characters designate corresponding parts in the several views.

DETAILED DESCRIPTION

Figure 1:
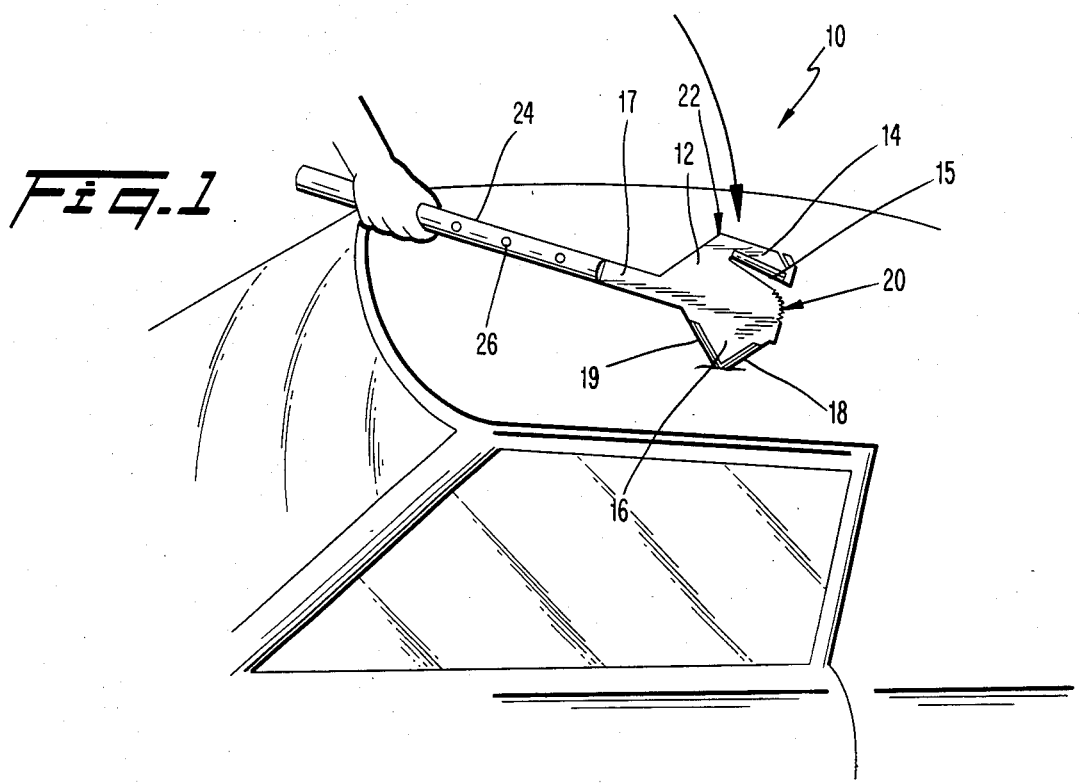
FIG. 1 is an elevational view showing the use of the rescue axe of the invention making a forcible entry into a vehicle body.

The rescue axe, generally designated 10, comprises a head portion 12 located at one end of a handle portion 17. Head portion 12 includes a piercing entry section 16, a cutting section 23 and an impacting section 22. A handle member 24 is attached to the handle portion 17 via bolts and nuts 26 and straps 25 as shown. In this particular embodiment, the handle member 24 is made of wood with the elongated handle portion 17 of head portion 12 extending into a slot cut in the end of the handle 24. Openings drilled in the handle portion 17 receive the bolts 26 to fix the handle member 24 to the handle portion 17 as shown.

Head portion 12 comprises a flat plate member having parallel broad sides with a peripheral edge defining an outer profile inclusive of the piercing entry section 16, cutting section 23, and the impacting section 22. The elongated handle member 24 disposed on handle portion 17 has a longitudinal axis and is located on the side opposite the head portion side including the cutting section 23. The outer edge of the cutting section 23 defines a direction extending transversely with respect to the longitudinal axis of handle 24 by an angle sufficient to protect the hands of the user of the axe 10. As measured from the vertical angle alpha ($\alpha$) the handle member 24 is offset so that when the axe 10 is swung as shown in FIG. 1, the hands of the user are protected. In this particular embodiment, the angle alpha ($\alpha$) equals approximately seventeen degrees (17°). The plate member forming head portion 12 is composed of low carbon, cold rolled steel and has a thickness of about one-quarter ($\frac{1}{4}$) inch.

The metal piercing entry section 16 is located on one side of head portion 12 and the impacting section 22 including a striking edge is located on the side opposite the metal piercing section 16. The cutting section 23 includes a blade cutting edge 15 extending rearwardly from an open mouth located on a side of head portion 12 between the one side including the piercing entry section 16 and the opposite side including the striking edge section 22. As is evident in the drawings, striking edge 22 has two sides extending in respective directions which intersect each other at an angle greater than 90°. A blade member 14 is located between the blade cutting edge 15 and the striking edge 22. Handle portion 17 extends rearwardly from a side of the head portion opposite the open mouth side of head portion 12.

The metal piercing entry section 16 comprises a pointed member extending outwardly from one side of head portion 12. The pointed member includes cutting edges 18 and 19 extending from an outer point to stop means 13 and 13a for limiting the depth of penetration of the pointed member entry section 16 when the axe is used to form an opening in the sheet metal of a vehicle. See FIG. 1.

The limiting stop means 13 and 13a include edge means against which the head portion 12 may be leveraged out of any opening made by the piercing entry section 16 upon penetration of the sheet metal of the vehicle body. As shown, the pointed member has a V-shaped profile. The cutting edges 18 and 19 extend from the point of the profile rearwardly along both edges of the pointed member to the edge means 13 and 13a located on respective sides of pointed member 16. Thus, a cutting edge extends along at least one edge of the V-shaped profile from the outer point.

Figure 2:
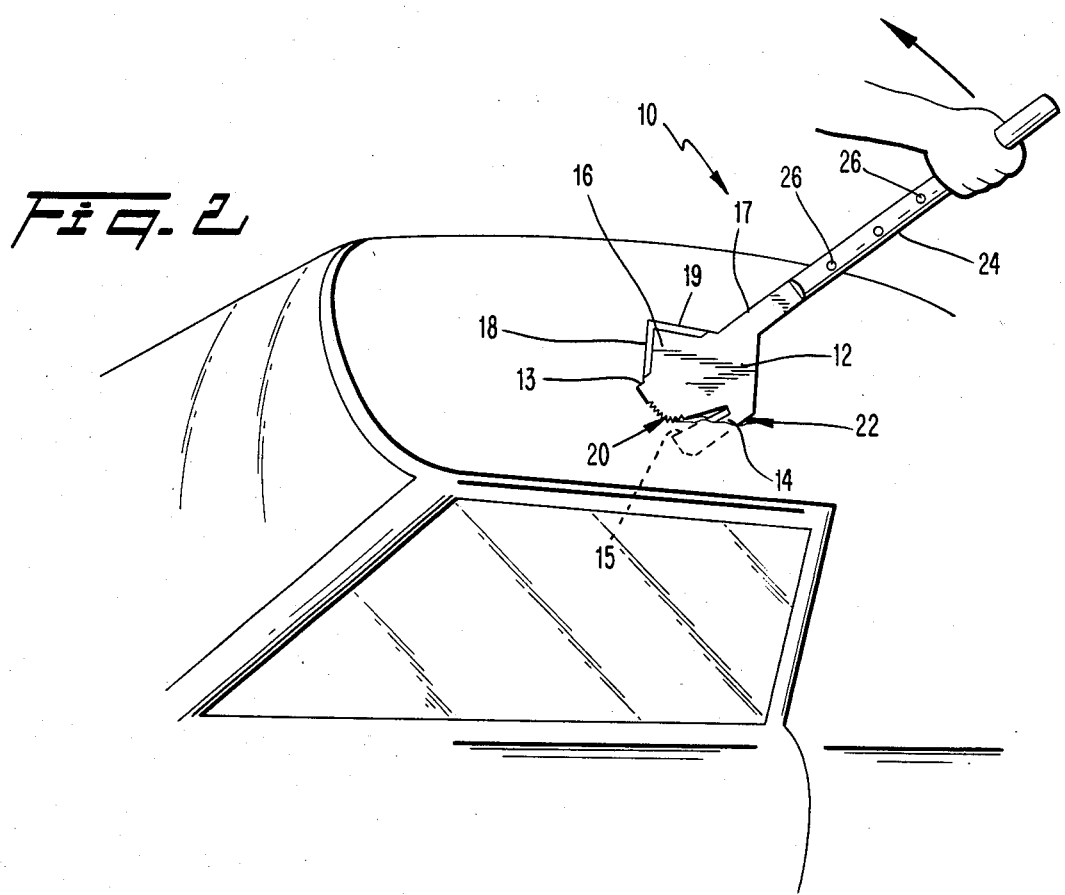
FIG. 2 is an elevational view showing the use of the rescue axe of the invention to cut an opening in the sheet metal of the vehicle body.

The blade member 14 is disposed on one side of the open mouth and a fulcrum section 20 is disposed on the other side of the open mouth opposite blade member 14 to form a cutting mouth. Fulcrum section 20 includes an outer end fulcrum contacting surface 21 which is effective to press against the top of a sheet of material while the blade cutting edge 15 is located below the sheet of material as shown in FIG. 2. Handle portion 17 and handle 24 are together effective for pulling upwardly to cause the blade cutting edge 15 to sever the sheet metal material as shown.

Fulcrum contacting surface 21 includes friction producing means formed along the outer edge of the fulcrum section 20 and includes notches as shown extending transversely of the edge and of pulling forces exerted on the handle portion 17. The notches define the friction producing means. This is particularly helpful where vehicle tops are made of vinyl or other types of plastic which would have tendancy to cause slippage when the axe is pulled upwardly to cause severing of the sheet metal material.

The blade cutting edge 15 has a length of about four (4) inches measured from one end thereof to the other in this embodiment. Such a blade length will effectively sever the sheet metal along a cut of from about two to three inches per pull as shown in FIG. 2. The overall length of the handle portion 17 together with the handle member 24 is about twenty-eight (28) inches long. The overall weight of the tool is in the range of three to six pounds depending upon the specific materials and the overall size of the head portion and handle portion.

The distance A measured between any point on the blade cutting edge 15 and any point on the striking edge 22 is an amount sufficient to withstand blows on the striking edge 22 and cutting pulls on cutting edge 15 while preventing blade member 14 from fracturing across that distance. While the striking edge section 22 is shown with an angle, it is possible that this edge might also be a continuously curved configuration.

Head portion 12 includes a sheet metal edge gripping portion for gripping the edge of the sheet material in the vehicle body so that the sheel material may be manipulated for further operation by the blade member. The edge gripping portion comprises a slit 11 extending from an outer edge of head portion 12 into the body of the head portion. The slit is sufficiently wide to receive the edge of the sheet material to be manipulated. As shown in this embodiment, slit 11 is straight and located at the outer end of blade member 14 on the side opposite blade cutting edge 15. The outer peripheral edge of blade member 14 includes an outer straight edge section 11a disposed in parallel relationship to straight slit 11.

It is understood that the single, one piece configuration of the rescue axe has many decided advantages. It can be easily carried in any kind of emergency vehicle and requires very little skill to operate. It is understood that longer handles or slightly different configuration of the head portion is possible. However, the embodiment that has been disclosed herein represents a workable and highly usable embodiment of the axe.

Many different types of materials may be used in constructing the head portion. While a low carbon, cold rolled steel has been used, it is possible to use high carbon steels with alloys if desired.

Figures 3, 4:
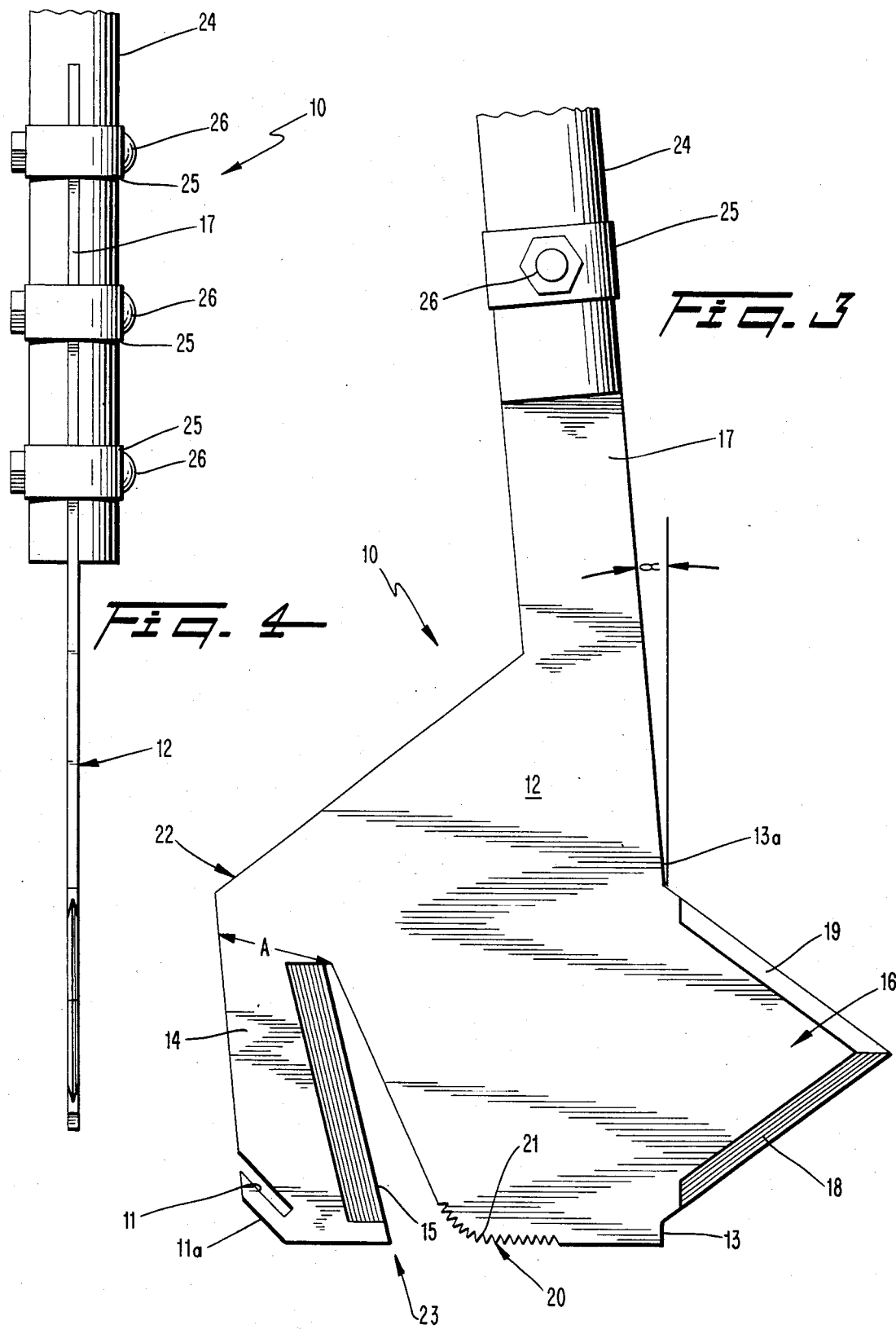
FIG. 3 is a plan view of a rescue axe made in accordance with this invention.
FIG. 4 is a side elevational view of the rescue axe as seen from the impacting side of the axe as shown in FIG. 3.

The present embodiment is shown with a handle member that is composed of a two inch stock of seasoned oak drilled with three stove bolts 26 inserted through the blade handle portion 17. The length of that handle portion 17 is about thirteen (13) inches inserted into the slot of the handle as shown in FIG. 4. It is possible that other types of handles may be usable with this particular rescue axe.

It is also conceivable that the present axe may be used to cut through the vehicle having a double roof configuration. That is, some vehicle bodies have two layers of sheet material for providing sound insulation to the interior of the vehicle body. The design of the present axe is sufficient to deal with such a situation.

The slit 11 may be about three-eighths($\frac{3}{8}$) inch deep. This enables the grasping of the edge of the sheet material as explained above. The use of the parallel side 11a enables the easy access of the slit to the edge of the sheet material when it is desired to manipulate same.

While the rescue axe has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of the invention, what is claimed is:

1. A rescue axe comprising:
   (a) a single, one piece head portion located at one end of a handle member;
   (b) said head portion including a piercing entry section, a cutting section, and an impacting section;
   (c) the entry section including a metal piercing means on a first side of the head portion;
   (d) the impacting section including a striking edge on a second side opposite the metal piercing means with said striking edge having two sides extending in respective directions which intersect each other at an angle greater than 90 degrees;
   (e) the cutting section including a blade cutting edge extending rearwardly from an open mouth located on a third side of the head portion between said first side including the piercing means and said second, opposite side including the striking edge;
   (f) said head portion including a blade member located between the blade cutting edge and the striking edge; and
   (g) the handle member extends rearwardly from a side of the head portion opposite said third open mouth side of the head portion,
   (h) the distance between any point on the blade cutting edge and any point on the striking edge is an amount sufficient to withstand blows on the striking edge and cutting pulls on the cutting edge while preventing the blade member from fracturing across said distance.

2. An axe as defined in claim 1 wherein the metal piercing means includes a pointed member extending outwardly from said first side of the head portion.

3. A rescue axe comprising:
   (a) a head portion located at one end of a handle portion;
   (b) said head portion including a piercing entry section, a cutting section, and an impacting section;
   (c) the entry section including a metal piercing means on one side of the head portion;
   (d) the impacting section including a striking edge on a side opposite the metal piercing means;
   (e) the cutting section including a blade cutting edge extending rearwardly from an open mouth located on a side of the head portion between said one side including the piercing means and said opposite side including the striking edge;
   (f) said head portion including a blade member located between the blade cutting edge and the striking edge; and
   (g) the handle portion extends rearwardly from a side of the head portion;
   (h) the pointed member including a cutting edge extending from an outer point to stop means for limiting the depth of penetration of the piercing means when the axe is used to form an opening in the sheet metal of a vehicle.

4. An axe as defined in claim 3 wherein said limiting stop means includes edge means against which the head portion may be leveraged out of the opening made by the piercing means upon penetration of the sheet metal in said vehicle.

5. An axe as defined in claim 4 wherein the pointed member has a V-shaped profile and the cutting edge extends from the point of said profile upwardly along both edges of the pointed member to edge means located on each side of said pointed member.

6. An axe as defined in claim 2 wherein
said pointed member has a V-shaped profile having an outer point, and
a cutting edge that is extending along at least one edge of said V-shaped profile from said outer point.

7. An axe as defined in claim 1 wherein
the blade member is disposed on one side of the open mouth and a fulcrum section is disposed on the other side of the open mouth opposite the blade member to form a cutting mouth.

8. An axe as defined in claim 7 wherein
the fulcrum section includes an outer end fulcrum contacting surface which is effective to press against the top of a sheet of material while the blade cutting edge is located below the sheet of material,
said handle portion being effective for pulling upwardly to cause the blade cutting edge to sever the sheet material.

9. An axe as defined in claim 8 wherein
the fulcrum contacting surface includes friction producing means to enhance the gripping function of the fulcrum contacting surface with a sheet of material being severed.

10. An axe as defined in claim 9 wherein
the fulcrum contacting surface is formed along the outer edge of the fulcrum section and includes notches extending transversely of pulling forces exerted on the handle portion,
said notches defining the friction producing means.

11. An axe as defined in claim 1 wherein
the blade cutting edge has a length of about four (4) inches measured from one end thereof to the other.

12. An axe as defined in claim 1 wherein
the head portion includes a sheet material edge gripping portion for gripping the edge of the sheet material to manipulate the position of the sheet material.

13. An axe as defined in claim 12 wherein
the edge gripping portion comprises a slit extending from an outer edge of the head portion into the body of said head portion,
said slit being sufficiently wide to receive the edge of the sheet material to be manipulated.

14. A rescue axe comprising:
(a) a head portion located at one end of a handle portion and including a sheet material edge gripping portion for gripping the edge of the sheet material to manipulate the position of the sheet material,
(b) the edge gripping portion comprising a slit extending from an outer edge of the head portion into the body of said head portion,
(c) said slit being sufficiently wide to receive the edge of the sheet material to be manipulated,
(d) the slit is straight and is located at the outer end of the blade member on the side of the blade member opposite the blade cutting edge,
(e) said head portion including a piercing entry section, a cutting section, and an impacting section,
(f) the entry section including a metal piercing means on one side of the head portion,
(g) the impacting section including a striking edge on a side opposite the metal piercing means,
(h) the cutting section including a blade cutting edge extending rearwardly from an open mouth located on a side of the head portion between said one side including the piercing means and said opposite side including the striking edge;
(i) said head portion including a blade member located between the blade cutting edge and the striking edge; and
(j) the handle portion extends rearwardly from a side of the head portion.

15. An axe as defined in claim 14 wherein
the outer peripheral edge of the blade member includes an outer straight edge section disposed in parallel relationship to the straight slit.

16. A rescue axe comprising:
(a) a head portion located at one end of a handle portion and comprising a flat plate member having two parallel broad sides across the entire head portion with a peripheral edge defining an outer profile inclusive of a piercing entry section, a cutting section, and an impacting section;
(b) the entry section including a metal piercing means on a first side of the head portion;
(c) the impacting section including a striking edge on a second side opposite the metal piercing means;
(d) the cutting section including a blade cutting edge extending rearwardly from an open mouth located on a third side of the head portion between said first side including the piercing means and said second, opposite side including the striking edge;
(e) said head portion including a blade member located between the blade cutting edge and the striking edge; and
(f) the handle portion extends rearwardly from a side of the head portion opposite said third, open mouth side of the head portion.

17. An axe as defined in claim 16 wherein
the handle portion includes an elongated handle member having a longitudinal axis;
the outer edge of said cutting section defining a direction extending transversely with respect to the longitudinal axis of the handle by an angle sufficient to protect the hands of the user of the axe.

18. An axe as defined in claim 16 wherein
the plate is composed of low carbon, cold rolled steel and has a thickness of about one-quarter (¼) inch.

* * * * *